Dec. 11, 1956     C. B. FRANCIS     2,773,748
APPARATUS FOR DETERMINING SULPHUR
Original Filed Feb. 9, 1950
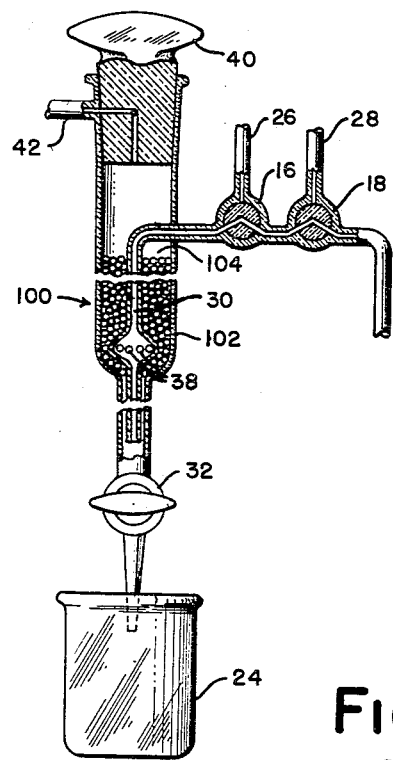
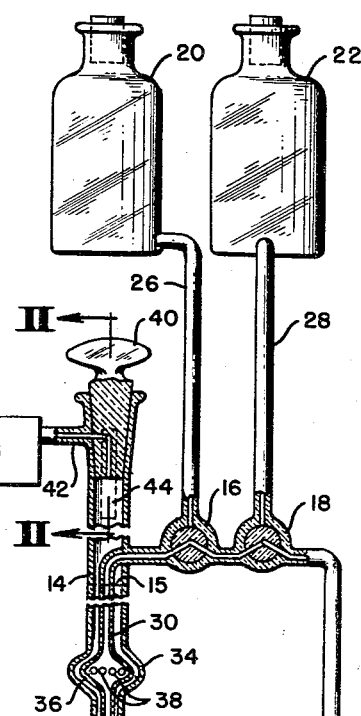
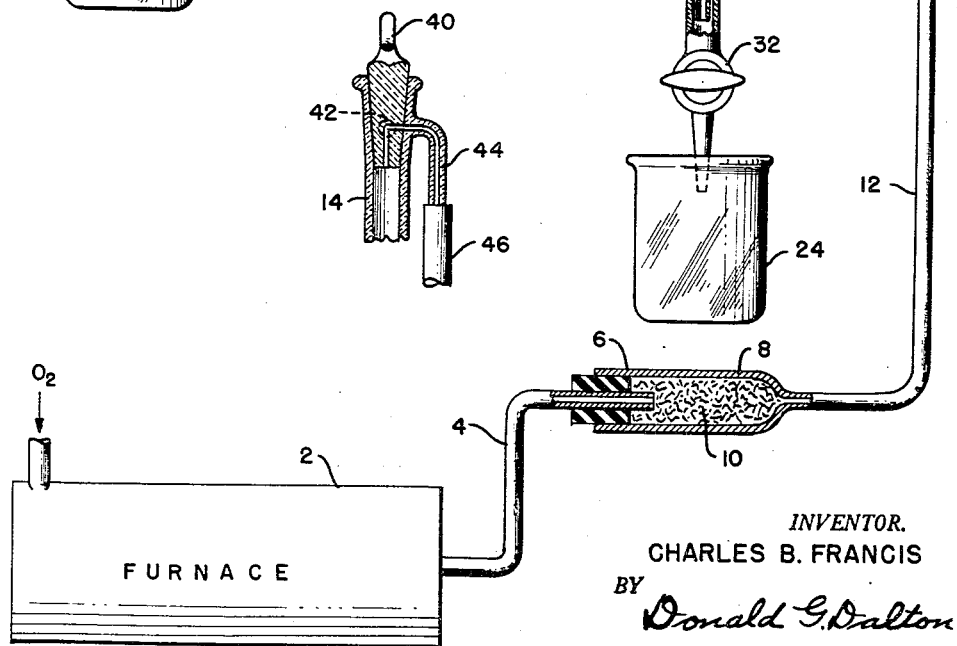
INVENTOR.
CHARLES B. FRANCIS
BY Donald G. Dalton
HIS ATTORNEY

United States Patent Office 2,773,748
Patented Dec. 11, 1956

2,773,748

APPARATUS FOR DETERMINING SULPHUR

Charles B. Francis, Pittsburgh, Pa.

Original application February 9, 1950, Serial No. 143,054, now Patent No. 2,639,980, dated May 26, 1953. Divided and this application October 22, 1952, Serial No. 316,223

1 Claim. (Cl. 23—259)

This invention, which is a division of my co-pending application, Serial No. 143,054, filed February 9, 1950, now Patent No. 2,639,980, dated May 26, 1953, relates to apparatus for determining the amount of sulphur and oxides thereof in various materials such as in iron and ferrous alloys. In the determination of sulphur by the apparatus commonly used at present the sample is destroyed so that it is necessary to provide a second sample when it is desired to further analyze the material such as for the amount of carbon in the sample. Also, in the apparatus presently used the sulphur dioxides will be absorbed but the sulphur trioxides will not be absorbed.

It is therefore an object of my invention to provide apparatus for determining sulphur and oxides thereof in a sample in such a manner that other tests may be made on the sample.

This and other objects will be more apparent after referring to the following specification and attached drawings, in which:

Figure 1 is a schematic view of the apparatus of my invention;

Figure 2 is a sectional view taken on the line II—II of Figure 1; and

Figure 3 is a schematic view of a second embodiment of my invention.

Referring more particularly to Figure 1 of the drawings, reference numeral 2 discloses a conventional high temperature tube furnace. The tube of this furnace is made of highly refractory non-porous material that will withstand temperatures up to 3000° F. without softening. The tube preferably has an internal diameter not exceeding 25 mm. and a length not exceeding 760 mm. A refractory boat containing the sample of steel to be analyzed is placed in this tube and the sample is completely oxidized by passing oxygen through the hot tube. A conduit 4 extends from the furnace 2 to a filter 6 which may be a glass tube 8 packed with cotton 10. A conduit 12 leads from the filter 6 to the sulphur analyzing unit of my invention which consists of a special absorption vessel 14 having a mark 15 thereon, two three-way stop cocks 16 and 18, a silver nitrate reservoir 20, a water reservoir 22, and a beaker 24. The three-way stop cocks 16 and 18 are connected in the conduit 12 and are connected by conduits 26 and 28 to the reservoirs 20 and 22, respectively. The special absorption vessel 14 has a gas dispersing tube 30 therein which has one end connected to the stop cock 16 and its other end terminating adjacent a stop cock 32 at the lower end of the absorption vessel 14. The vessel 14 is provided with a bulbous portion 34 for receiving a similar bulbous portion 36 on the tube 30. The bulbous portion 36 is provided with small openings 38 spaced around its periphery. The top part of the vessel 14 is provided with a stop cock 40. In its normal position the stop cock 40 connects the interior of the vessel 14 to a conduit 42 which leads to a carbon absorption unit B such as disclosed in my above mentioned patent. By turning stop cock 40 counterclockwise through an angle of 45° the exit to conduit 42 is closed and by turning it clockwise through an angle of 45° the interior of the vessel 14 is connected to the outside air through a second conduit 44 as best shown in Figure 2. This second conduit 44 is preferably connected by means of a rubber hose 46 to the beaker 24 which is located beneath the vessel 14.

In some instances the absorption tube 14 may be made in a different manner than shown in Figure 1. As shown in Figure 3, the absorption tube 14 is replaced by a tube 100 having a cylindrical upper portion 102 of sufficient diameter to admit the dispersing tube 30. The upper portion 102 is partly filled with glass beads 104 to occupy about 60% of the space.

The procedure followed in determining the amount of sulphur in steel is as follows:

The sample is prepared in the usual manner and a known amount, such as 2.4 grams thereof, is placed in the combustion boat which in turn is placed in the combustion tube in the furnace 2. Between 5 and 10 ml. of silver nitrate solution is introduced into the absorber 14 from the reservoir 20, thus causing the silver nitrate to rise to the mark 15 on the wall of absorber 14. The sample is then ignited in the furnace 2 and stop cocks 16 and 18 turned to the position shown in Figure 1. The gas evolved passes through conduit 12 through the gas dispersing tube 30 and the openings 38 into the silver nitrate in the vessel 14. The silver nitrate will absorb the sulphur oxides evolved. If the sample is being analyzed for carbon or other material the gases will pass through the conduit 42 to the carbon dioxide absorbing apparatus B and the gas is analyzed in the manner set forth in my above mentioned copending application. The sulphur is oxidized to form sulphur dioxide, with the possibility that some of the $SO_2$ is catalytically oxidized to sulphur trioxide $SO_3$. These gases are capable of uniting with metallic oxides to form sulfites and sulfates which are held in solution by the liquid or semi-fluid slag formed. Consequently, only a part of the sulphur escapes as $SO_2$ during and immediately following the combustion, and the remainder is evolved more slowly from the slag as the sulfates and sulfites are decomposed by heat from the furnace. This is not true of the oxides of carbon and the carbon analysis can be run while the evolution of the sulphur oxides continues. After all the carbon has been oxidized to carbon dioxide the stop cock 40 is turned to shut off the flow of gas to conduit 42 and to exhaust the gas through tube 46 to beaker 24. The rate of flow of the oxygen into the furnace 2 is then increased to evolve the remainder of the sulphur.

To find the percent sulphur in the gas, the oxygen flow is turned off at the end of five minutes or after all the sulphur has evolved, and stop cock 32 is turned to permit the silver nitrate solution in the absorber 14 to flow into the titrating beaker 24. To rinse the absorber, stop cock 32 is closed and stop cock 18 is turned to connect with the water reservoir 22 until the absorber 14 is filled with water, after which stop cock 18 is closed and stop cock 32 is opened, thus permitting the rinse water to flow into the titrating beaker 24. After the addition of one or two drops of an indicator solution, the acid equivalent to the sulphur in the sample is titrated with a standard solution of sodium hydroxide (approximately 5 thousandths normal) from a burette. The number of milliliters of this solution used to titrate the silver nitrate solution, divided by three, gives the sulphur content of the sample in hundredths of a percent.

The carbon determining apparatus B is then prepared for determining the amount of carbon in the following sample in the manner set forth in my above mentioned copending application. Stop cock 40 is then turned to connect with the atmosphere. Stop cock 32 is closed and stop cock 16 is turned to admit silver nitrate solution from reservoir 20 until the liquid rises to the mark 15 on the wall of absorber 14. Stop cocks 16 and 18 are then turned to connect the absorber with the combustion tube in furnace 2. The boat is withdrawn from the combustion tube and placed under cover to cool, after which the apparatus is ready to receive another sample.

While several embodiments of my invention have been shown and described it will be apparent that other adaptations and modifications may be made without departing from the scope of the following claim.

I claim:

Apparatus for absorbing in a liquid a gas from a mixture of gases comprising an elongated vessel, the top section of said vessel having two outlets, a three-way stop cock in said top section for controlling flow of gas to said outlets, said three-way stop cock being movable to one position to prevent escape of gas from said vessel and to another position to permit flow of unabsorbed gases therefrom, the bottom section of said vessel having an opening therein, a stop cock in said bottom section, said last named stop cock being movable to one position to close said opening and to another position to permit flow of liquid therefrom, a gas dispersing tube in said vessel, said tube having a bulbous portion intermediate its ends with openings therein, the bottom of said tube being open and extending to a point above the last named stop cock, and the top of said tube extending through the wall of said vessel below the top thereof, said tube adapted to be connected to said mixture of gases, a second three-way stock cock, a third three-way stop cock, said second and third three-way stop cocks being positioned in the portion of said tube outside said vessel, a reservoir adapted to contain gas absorbing liquid, a reservoir adapted to contain a rinsing liquid, a connection between the second three-way stop cock and the first named reservoir, and a connection between the third three-way stop cock and the last named reservoir, said second three-way stop cock being movable to one position to permit flow of absorbing liquid to said vessel and to another position to stop flow of absorbing liquid and permit flow of the mixture of gases to said vessel, said third three-way stop cock being movable to one position to permit flow of rinsing liquid to said vessel and to another position to stop flow of rinsing liquid and permit flow of the mixture of gases to said vessel.

References Cited in the file of this patent

UNITED STATES PATENTS

| | | |
|---|---|---|
| 1,074,795 | Johnson | Oct. 7, 1913 |
| 1,668,362 | Francis | May 1, 1928 |
| 1,877,151 | Turner | Sept. 13, 1932 |
| 2,014,823 | Tram | Sept. 17, 1935 |
| 2,045,866 | Morrison | June 30, 1936 |
| 2,224,044 | Francis et al. | Dec. 3, 1940 |
| 2,336,075 | Derge | Dec. 7, 1943 |
| 2,462,293 | Thomas | Feb. 22, 1949 |
| 2,585,314 | Hazeltine | Feb. 13, 1952 |
| 2,610,107 | Dreher | Sept. 9, 1952 |
| 2,639,980 | Francis | May 26, 1953 |

OTHER REFERENCES

A. S. T. M. Methods Chemical Analysis of Metals, 1946, pages 17–20; pub. by Am. Society for Testing Materials, 1916, Race St., Philadelphia 3, Pa.